US012809335B2

(12) United States Patent
Spaner et al.

(10) Patent No.: US 12,809,335 B2
(45) Date of Patent: Nov. 24, 2026

(54) SYSTEMS AND METHODS FOR INDUSTRIAL SYSTEMS DIAGNOSTICS USING MOBILE DEVICE IMAGING

(71) Applicant: Rockwell Automation Technologies, Inc., Mayfield Heights, OH (US)

(72) Inventors: Michael A. Spaner, Deep River, CT (US); Jack M. Visoky, Willoughby, OH (US); Katherine Sokolnicki, Chelmsford, MA (US); Taryl J. Jasper, South Euclid, OH (US); Chris Softley, Midlothian (GB)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 327 days.

(21) Appl. No.: 18/582,075

(22) Filed: Feb. 20, 2024

(65) Prior Publication Data

US 2025/0264859 A1 Aug. 21, 2025

(51) Int. Cl.
*G05B 19/4065* (2006.01)

(52) U.S. Cl.
CPC .................... *G05B 19/4065* (2013.01); *G05B 2219/31368* (2013.01); *G05B 2219/37228* (2013.01)

(58) Field of Classification Search
CPC ...... G05B 19/4065; G05B 2219/31368; G05B 2219/37228
See application file for complete search history.

(56) References Cited

U.S. PATENT DOCUMENTS

| | | | | |
|---|---|---|---|---|
| 9,805,343 | B2 * | 10/2017 | Celinder | G06Q 10/20 |
| 10,520,927 | B2 * | 12/2019 | Acharya | G05B 19/4183 |
| 11,348,355 | B1 * | 5/2022 | Sohmshetty | G06V 40/23 |
| 12,487,582 | B2 * | 12/2025 | Sandler | G06F 9/5027 |
| 2002/0131633 | A1 * | 9/2002 | Zwick | G06T 7/0004 382/152 |
| 2003/0093183 | A1 * | 5/2003 | Bunn | G05B 19/41875 700/259 |
| 2008/0174771 | A1 * | 7/2008 | Yan | G01N 21/8901 356/237.5 |
| 2014/0114612 | A1 * | 4/2014 | Yoskovitz | G01N 29/14 702/183 |
| 2014/0218503 | A1 * | 8/2014 | Gerling | G01B 21/02 348/92 |
| 2017/0160733 | A1 * | 6/2017 | Oostendorp | G05B 23/0272 |
| 2017/0363969 | A1 * | 12/2017 | Hauptmann | G03F 7/70616 |
| 2018/0096215 | A1 * | 4/2018 | Bartoshesky | H04N 23/51 |
| 2018/0275630 | A1 * | 9/2018 | Kao | G05B 19/4065 |
| 2018/0348741 | A1 * | 12/2018 | Maenosono | G05B 19/4184 |

(Continued)

*Primary Examiner* — Ramsey Refai
(74) *Attorney, Agent, or Firm* — Fletcher Yoder, P.C.

(57) ABSTRACT

A method includes receiving an indication of an inspection of an industrial automation device being triggered, displaying, via a display of a mobile computing device, instructions for performing the inspection of the industrial automation device, receiving, via one or more sensors of the mobile computing device, one or more sensors communicatively coupled to the mobile computing device, or both, inspection data associated with the industrial automation device, processing the inspection data associated with the industrial automation device to generate results of the inspection of the industrial automation device, and displaying, via the display of the mobile computing device, the results of the inspection of the industrial automation device.

20 Claims, 5 Drawing Sheets

(56) References Cited

U.S. PATENT DOCUMENTS

| | | | | |
|---|---|---|---|---|
| 2019/0033833 | A1* | 1/2019 | Acharya | G05B 19/4183 |
| 2019/0210159 | A1* | 7/2019 | Endoh | G01N 27/20 |
| 2020/0133224 | A1* | 4/2020 | Popp | G05B 19/188 |
| 2021/0374928 | A1* | 12/2021 | Hida | G06F 18/2433 |
| 2022/0134459 | A1* | 5/2022 | Dietz | B23F 1/023<br>451/5 |
| 2022/0244194 | A1* | 8/2022 | Perron | G01N 21/8851 |
| 2022/0244701 | A1* | 8/2022 | Brand | G05B 19/4061 |
| 2025/0117920 | A1* | 4/2025 | Erol | G06T 7/0008 |

* cited by examiner

SYSTEMS AND METHODS FOR INDUSTRIAL SYSTEMS DIAGNOSTICS USING MOBILE DEVICE IMAGING

BACKGROUND

The present disclosure generally relates to performing inspections of industrial automation devices.

Industrial automation systems may be used to provide automated control of one or more industrial automation devices (e.g., including one or more actuators) in an industrial setting. Inspection systems for inspecting such industrial automation systems may be expensive, designed to perform a single type of inspection and/or inspect a single type of device, produce data of significantly higher resolution than is needed for an initial inspection, require specialized training by an operator, may require specific conditions to operate (e.g., ambient light levels, temperature ranges, lack of movement, etc.) and tend to be fixed in place within a facility. Accordingly, new techniques for inspecting industrial automation systems that are less expensive and more flexible are desired.

This section is intended to introduce the reader to aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

BRIEF DESCRIPTION

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In an embodiment, a method includes receiving an indication of an inspection of an industrial automation device being triggered, displaying, via a display of a mobile computing device, instructions for performing the inspection of the industrial automation device, receiving, via one or more sensors of the mobile computing device, one or more sensors communicatively coupled to the mobile computing device, or both, inspection data associated with the industrial automation device, processing the inspection data associated with the industrial automation device to generate results of the inspection of the industrial automation device, and displaying, via the display of the mobile computing device, the results of the inspection of the industrial automation device.

In another embodiment, a non-transitory computer readable medium stores instructions that, when executed by processing circuitry of a mobile computing device, cause the processing circuitry to receive an indication of an inspection of an industrial automation device being triggered, display, via a display of the mobile computing device, instructions for performing the inspection of the industrial automation device, receive, via one or more sensors, inspection data associated with the industrial automation device, and display, via the display of the mobile computing device, results of the inspection of the industrial automation device.

In a further embodiment, an edge device includes processing circuitry and a memory. The memory is accessible by the processing circuitry and stores instructions that, when executed by the processing circuitry, cause the processing circuitry to receive, from a mobile computing device, inspection data associated with an industrial automation device, wherein the inspection data was collected via one or more sensors of the mobile computing device during an inspection, one or more sensors communicatively coupled to the mobile computing device, or both, wherein the inspection data includes one or more images, one or more videos, one or more audio recordings, vibration data, one or more radio frequency (RF) scans, temperature data, infrared imaging data, electromagnetic field (EMF) data, accelerometer data, gyroscope data, light detection and ranging (LIDAR) data, or any combination thereof, process, via a containerized application running in a container executed by the edge device, the inspection data associated with the industrial automation device to generate results of the inspection of the industrial automation device, and transmit, to the mobile computing device, the results of the inspection of the industrial automation device.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

These and other features, aspects, and advantages of the present embodiments will become better understood when the following detailed description is read with reference to the accompanying drawings in which like characters represent like parts throughout the drawings, wherein.

DETAILED DESCRIPTION

Figure 1:
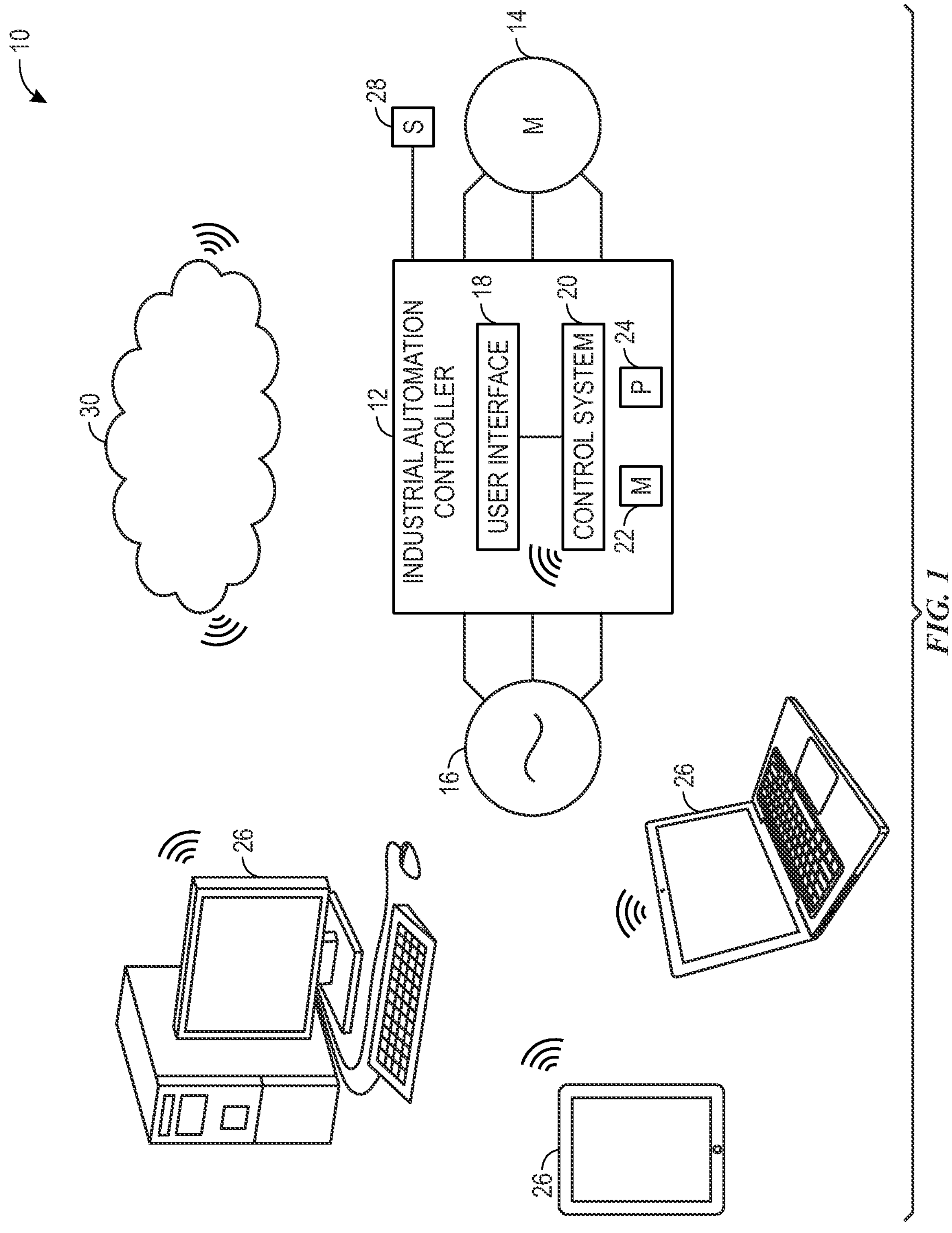
FIG. 1 is a schematic view of an industrial automation system, in accordance with embodiments presented herein.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and enterprise-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements.

Inspection systems for industrial automation systems tend to be expensive, designed to perform a single type of inspection and/or inspect a single type of device, produce data of significantly higher resolution than is needed for an initial inspection, require specialized training by an operator, may require specific conditions to operate (e.g., ambient light levels, temperature ranges, lack of movement, etc.) and tend to be fixed in place within a facility. However, mobile devices (e.g., smartphones, tablets, etc.) carried by inspectors on a factory floor may be equipped with various sensors and processing capabilities to perform initial diagnostic inspections of sufficient resolution to identify conditions and/or determine if further inspection is warranted. Accordingly, the present disclosure is related to using a mobile device for inspection of industrial automation systems.

Specifically, a mobile device may be equipped with an inspection application, which may run natively on the mobile device or as a web application. An inspection may be triggered in some way. In some cases, the inspection may be a routine or scheduled inspection that may be carried out by an inspector at his or her leisure or in response to a notification displayed by the mobile device. In other cases, the inspection may be triggered by a condition of an industrial automation system being detected. In such cases, the condition may be detected, either by the system itself or by some device monitoring the system, and a notification (e.g., a push notification) may be generated and displayed by the mobile device requesting that an inspector perform an inspection of the device. In some cases, a particular mobile device within the facility may be selected based upon its proximity to the industrial automation system in question, the skills of the inspector associated with the mobile device, or some other factor.

Upon arrival at the industrial automation system to be inspected, the mobile device may be used to scan a bar code, a QR code, an RFID tag, photograph the system and/or a label on the industrial automation system, take a video of the system, etc. to identify the industrial automation system to be inspected. In some cases, the scanned codes may include information, such as inspections to be performed, how to perform inspections, links to media to be consumed by the inspector, baseline values, threshold values, maintenance history, etc. The mobile device may display, via the inspection application, instructions for performing the inspection using the mobile device. In some cases, the industrial automation system may be equipped with markings that indicate where an inspector should place the mobile device to collect data, and/or areas to capture via photo and/or video.

In some cases, the inspection may include a photo, video, or radio frequency (RF) scan of the industrial automaton system to identify anomalous conditions, determine if further inspection is warranted, or perform other diagnostics. For example, in some embodiments, the industrial automation device may communicate data to the mobile device that may not be perceptible to the inspector, such as display/LED flashing patterns, sounds, and so forth, which may communicate an error code or an anomalous condition has been detected. In some cases, routine photo, video, RF scans collected during inspections at certain intervals may be analyzed to identify drift, steps, or other changes over time. Accordingly, data from scans may be used to create inspection baselines and to identify when something has changed between inspections (e.g., wiring change, switches in different positions, different operational settings, etc.). The inspection may include, for example, collecting audio data via the microphone of the mobile device. Performing an inspection may include, for example, setting the mobile device on a component of the industrial automation system (e.g., a gearbox) and using the accelerometers, gyroscope, and/or microphone of the mobile device to collect vibration data. In some cases, an on-board or add-on thermometer may be used to collect temperature data. Some inspection may utilize accessory sensors that couple to the mobile device. For example, the mobile device may couple to an infrared (IR) sensor or imaging device to collect IR sensor data. Similarly, an on-board or add-on RF receiver may be used to detect harmonics and/or act as an electromagnetic field (EMF) sensor, which could be used to detect drive signatures, power surges, and so forth, which can be correlated to particular anomalous conditions like a component that needs to be replaced or undesirable interactions between two or more components. Further, the camera of the mobile device could be used to take photos or video of product for quality control (QC). Other inspections may utilize the LIDAR, GPS, Bluetooth, radio/modem, accelerometers, and/or other capabilities of the mobile device to perform inspections of equipment, raw materials, and/or product being produced.

Inspection data could be processed on the mobile device itself, sent to another device (e.g., on-prem server, cloud-server, remote sever, workstation computer, edge device, container, etc.) for processing, or some combination thereof. Once analysis of the inspection data has been performed, the system may determine next steps. For example, in some cases, no further action may be warranted. In other cases, the inspector may be asked to perform additional inspections using the mobile device. In further cases, a technician or another inspector may be called to perform more inspections, perform maintenance, perform troubleshooting, repair the industrial automation system, and so forth. Additional details with regard to using mobile computing devices to inspect industrial automation systems in accordance with the techniques described above will be provided below with reference to FIGS. 1-6.

By way of introduction, FIG. 1 is a schematic view of an example industrial automation system 10 in which the embodiments described herein may be implemented. As shown, the industrial automation system 10 includes a controller 12 and an actuator 14 (e.g., a motor). The industrial automation system 10 may also include, or be coupled to, a power source 16. The power source 16 may include a generator, an external power grid, a battery, or some other source of power. The controller 12 may be a stand-alone control unit that controls multiple industrial automation components (e.g., a plurality of motors 14), a controller 12 that controls the operation of a single automation component (e.g., motor 14), or a subcomponent within a larger industrial automation system 10. In the instant embodiment, the controller 12 includes a user interface 18, such as a human machine interface (HMI), and a control system 20, which may include a memory 22 and a processor 24. The controller 12 may include a cabinet or some other enclosure for housing various components of the industrial automation system 10, such as a motor starter, a disconnect switch, etc.

The control system 20 may be programmed (e.g., via computer readable code or instructions stored on the memory 22, such as a non-transitory computer readable medium, and executable by the processor 24) to provide signals for controlling the motor 14. In certain embodiments, the control system 20 may be programmed according to a specific configuration desired for a particular application. For example, the control system 20 may be programmed to respond to external inputs, such as reference signals, alarms, command/status signals, etc. The external inputs may originate from one or more relays or other electronic devices. The programming of the control system 20 may be accomplished through software or firmware code that may be loaded onto the internal memory 22 of the control system 20 (e.g., via a locally or remotely located computing device 26) or programmed via the user interface 18 of the controller 12. The control system 20 may respond to a set of operating parameters. The settings of the various operating parameters may determine the operating characteristics of the controller 12. For example, various operating parameters may determine the speed or torque of the motor 14 or may determine how the controller 12 responds to the various external inputs. As such, the operating parameters may be used to map control variables within the controller 12 or to control other devices communicatively coupled to the controller 12. These variables may include, for example, speed presets, feedback types and values, computational gains and variables, algorithm adjustments, status and feedback variables, programmable logic controller (PLC) control programming, and the like.

In some embodiments, the controller 12 may be communicatively coupled to one or more sensors 28 for detecting operating temperatures, voltages, currents, pressures, flow rates, and other measurable variables associated with the industrial automation system 10. With feedback data from the sensors 28, the control system 20 may keep detailed track of the various conditions under which the industrial automation system 10 may be operating. For example, the feedback data may include conditions such as actual motor speed, voltage, frequency, power quality, alarm conditions, etc. In some embodiments, the feedback data may be communicated back to the computing device 26 for additional analysis.

The computing device 26 may be communicatively coupled to the controller 12 via a wired or wireless connection. The computing device 26 may receive inputs from a user defining an industrial automation project using a native application running on the computing device 26 or using a website accessible via a browser application, a software application, or the like. The user may define the industrial automation project by writing code, interacting with a visual programming interface, inputting or selecting values via a graphical user interface, or providing some other inputs. The user may use licensed software and/or subscription services to create, analyze, and otherwise develop the project. The computing device 26 may send a project to the controller 12 for execution. Execution of the industrial automation project causes the controller 12 to control components (e.g., motor 14) within the industrial automation system 10 through performance of one or more tasks and/or processes. In some applications, the controller 12 may be communicatively positioned in a private network and/or behind a firewall, such that the controller 12 does not have communication access outside a local network and is not in communication with any devices outside the firewall, other than the computing device 26. The controller 12 may collect feedback data during execution of the project, and the feedback data may be provided back to the computing device 26 for analysis. Feedback data may include, for example, one or more execution times, one or more alerts, one or more error messages, one or more alarm conditions, one or more temperatures, one or more pressures, one or more flow rates, one or more motor speeds, one or more voltages, one or more frequencies, and so forth. The project may be updated via the computing device 26 based on the analysis of the feedback data.

The computing device 26 may be communicatively coupled to a cloud server 30 or remote server via the internet, or some other network. In one embodiment, the cloud server 30 may be operated by the manufacturer of the controller 12, a software provider, a seller of the controller 12, a service provider, operator of the controller 12, owner of the controller 12, etc. The cloud server 30 may be used to help customers create and/or modify projects, to help troubleshoot any problems that may arise with the controller 12, develop policies, or to provide other services (e.g., project analysis, enabling, restricting capabilities of the controller 12, data analysis, controller firmware updates, etc.). The remote/cloud server 30 may be one or more servers operated by the manufacturer, software provider, seller, service provider, operator, or owner of the controller 12. The remote/cloud server 30 may be disposed at a facility owned and/or operated by the manufacturer, software provider, seller, service provider, operator, or owner of the controller 12. In other embodiments, the remote/cloud server 30 may be disposed in a datacenter in which the manufacturer, software provider, seller, service provider, operator, or owner of the controller 12 owns or rents server space. In further embodiments, the remote/cloud server 30 may include multiple servers operating in one or more data center to provide a cloud computing environment.

Figure 2:
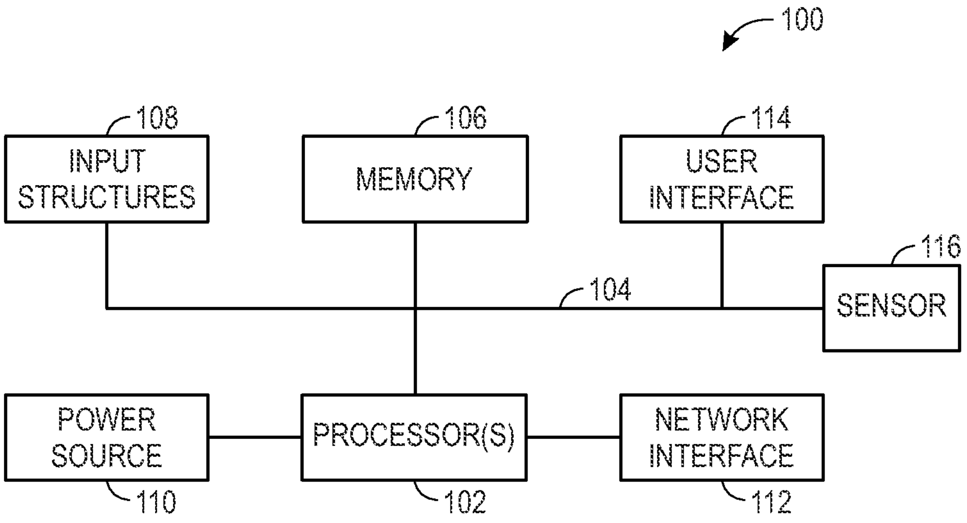
FIG. 2 is a block diagram of example components that could be used in the industrial automation system of FIG. 1, in accordance with embodiments presented herein.

FIG. 2 illustrates a block diagram of example components of a computing device 100 that could be used as the computing device 26, the cloud/remote server 30, the controller 12, an edge device, or some other device within the system 10 shown in FIG. 1. As used herein, a computing device 100 may be implemented as one or more computing systems including laptop, notebook, desktop, tablet, HMI, or workstation computers, as well as server type devices or portable, communication type devices, such as cellular telephones and/or other suitable computing devices, such as edge devices.

As illustrated, the computing device 100 may include various hardware components, such as one or more processors 102, one or more busses 104, memory 106, input structures 108, a power source 110, a network interface 112, a user interface 114, one or more sensors 116, and/or other computer components useful in performing the functions described herein.

The one or more processors 102 may include, in certain implementations, microprocessors configured to execute instructions stored in the memory 106 or other accessible locations. Alternatively, the one or more processors 102 may be implemented as application-specific integrated circuits (ASICs), field-programmable gate arrays (FPGAs), and/or other devices designed to perform functions discussed herein in a dedicated manner. As will be appreciated, multiple processors 102 or processing components may be used to perform functions discussed herein in a distributed or parallel manner.

The memory 106 may encompass any tangible, non-transitory medium for storing data or executable routines. Although shown for convenience as a single block in FIG. 2, the memory 106 may encompass various discrete media in the same or different physical locations. The one or more processors 102 may access data in the memory 106 via one or more busses 104.

The input structures 108 may allow a user to input data and/or commands to the device 100 and may include mice, touchpads, touchscreens, keyboards, controllers, and so forth. The power source 110 can be any suitable source for providing power to the various components of the computing device 100, including line and battery power. In the depicted example, the device 100 includes a network interface 112. Such a network interface 112 may allow communication with other devices on a network using one or more communication protocols. In the depicted example, the device 100 includes a user interface 114, such as a display that may display images or data provided by the one or more processors 102. The user interface 114 may include, for example, a monitor, a display, and so forth.

The one or more sensors 116 may be integrated into the computing device 100 (e.g., disposed within a housing of the computing device) or external to the computing device 100 and configured to communicatively couple to the computing device via a wired (e.g., USB) connection or a wireless (e.g., Bluetooth, near field communication (NFC), etc.) connection. The one or more sensors 116 may be configured to collect data and provide the collected data to the computing device 100. Accordingly, the one or more sensors 116 may include cameras or other imaging components, microphones, temperature sensors, accelerometers, gyroscopes, radio frequency (RF) scanners/receivers, infrared sensors, Light Detection and Ranging (LIDAR) sensors, global positioning system (GPS) sensors, Bluetooth sensors, radio transmitters/receivers, modems, etc. As will be appreciated, in a real-world context a processor-based system, such as the computing device 100 of FIG. 2, may be employed to implement some or all of the present approach, such as performing the functions of the controller, the computing device 26, and/or the cloud/remote server 30 shown in FIG. 1, as well as other memory-containing devices, such as the edge devices shown in FIG. 4.

Figure 3:
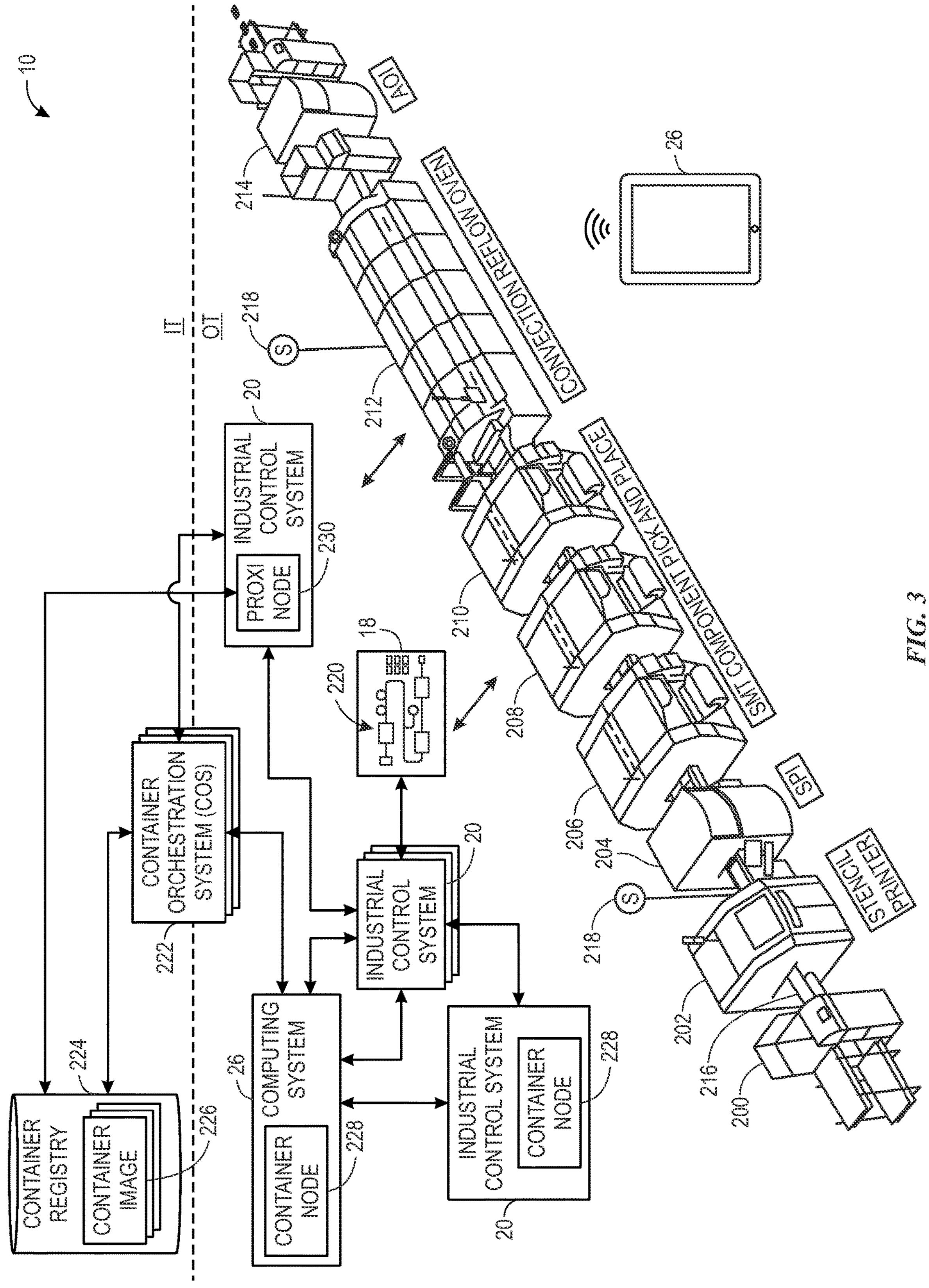
FIG. 3 is a perspective view of an example of the industrial automation system of FIG. 1 controlled by an industrial control system, in accordance with an embodiment.

FIG. 3 is a perspective view of an example of the industrial automation system 10 of FIG. 1. The industrial automation system 10 includes stations 200, 202, 204, 206, 208, 210, 212, 214 having machine components and/or machines to conduct functions within an automated process, such as printed circuit board assembly, as is depicted. The automated process may begin at a station 200 used for loading objects, such as substrates, into the industrial automation system 10 via a conveyor section 216. For example, objects may be transported along the conveyor section 216 to station 202 to perform a first action, such a printing solder paste to the substrate via stenciling. As objects exit from the station 202, the objects may be transported via the conveyor section 216 to a station 204 for solder paste inspection (SPI) to inspect printer results, to a station 206, 208, and 210 for surface mount technology (SMT) component placement, to a station 212 for convection reflow oven to melt the solder to make electrical couplings, and finally to a station 214 for automated optical inspection (AOI) to inspect the object manufactured (e.g., the manufactured printed circuit board). After the objects proceed through the various stations, the objects may be removed from the station 214, for example, for storage in a warehouse or for shipment. It should be understood, however, that, for other applications, the particular system, machine components, machines, stations, and/or conveyors may be different or specially adapted to the application.

For example, the industrial automation system 10 may include machinery to perform various operations in a compressor station, an oil refinery, a batch operation for making food items, chemical processing operations, brewery operations, mining operations, a mechanized assembly line, and so forth. Accordingly, the industrial automation system 10 may include a variety of operational components, such as electric motors, valves, actuators, temperature elements, pressure sensors, or a myriad of machinery or devices used for manufacturing, processing, material handling, and other applications. The industrial automation system 10 may also include electrical equipment, hydraulic equipment, compressed air equipment, steam equipment, mechanical tools, protective equipment, refrigeration equipment, power lines, hydraulic lines, steam lines, and the like. Some example types of equipment may include mixers, machine conveyors, tanks, skids, specialized original equipment manufacturer machines, and the like. In addition to the equipment described above, the industrial automation system 10 may also include motors, protection devices, switchgear, compressors, and the like. Each of these described operational components may correspond to and/or generate a variety of OT data regarding operation, status, sensor data, operational modes, alarm conditions, or the like, that may be desirable to output for analysis with IT data from an IT network, for storage in an IT network, for analysis with expected operation set points (e.g., thresholds), or the like.

In certain embodiments, one or more properties of the industrial automation system 10 equipment, such as the stations 200, 202, 204, 206, 208, 210, 212, 214, may be monitored and controlled by the industrial control systems 20 for regulating control variables. For example, sensing devices (e.g., sensors 218) may monitor various properties of the industrial automation system 10 and may be used by the industrial control systems 20 at least in part in adjusting operations of the industrial automation system 10 (e.g., as part of a control loop). In some cases, the industrial automation system 10 may be associated with devices used by other equipment. For instance, scanners, gauges, valves, flow meters, and the like may be disposed on or within the industrial automation system 10. Here, the industrial control systems 20 may receive data from the associated devices and use the data to perform their respective operations more efficiently. For example, a controller of the industrial automation system 10 associated with a motor drive may receive data regarding a temperature of a connected motor and may adjust operations of the motor drive based on the data.

The industrial control systems 20 may include or be communicatively coupled to the display/operator interface 18 (e.g., a human-machine interface (HMI)) and to devices of the industrial automation system 10. It should be understood that any suitable number of industrial control systems 20 may be used in a particular industrial automation system 10 embodiment. The industrial control systems 20 may facilitate representing components of the industrial automation system 10 through programming objects that may be instantiated and executed to provide simulated functionality similar or identical to the actual components, as well as visualization of the components, or both, on the display/operator interface 18. The programming objects may include code and/or instructions stored in the industrial control systems 20 and executed by processing circuitry of the industrial control systems 20. The processing circuitry may communicate with memory circuitry to permit the storage of the component visualizations.

As illustrated, a display/operator interface 18 may be configured to depict representations 220 of the components of the industrial automation system 10. The industrial control system 20 may use data transmitted by the sensors 218 to update visualizations of the components via changing one or more statuses, states, and/or indications of current operations of the components. These sensors 218 may be any suitable device adapted to provide information regarding process conditions. Indeed, the sensors 218 may be used in a process loop (e.g., control loop) that may be monitored and controlled by the industrial control system 20. As such, a process loop may be activated based on process inputs (e.g., an input from the sensor 218) or direct input from a person via the display/operator interface 18. The person operating and/or monitoring the industrial automation system 10 may reference the display/operator interface 18 to determine various statuses, states, and/or current operations of the industrial automation system 10 and/or for a particular component. Furthermore, the person operating and/or monitoring the industrial automation system 10 may adjust to various components to start, stop, power-down, power-on, or otherwise adjust an operation of one or more components of the industrial automation system 10 through interactions with control panels or various input devices.

The industrial automation system 10 may be considered a data-rich environment with several processes and operations that each respectively generate a variety of data. For example, the industrial automation system 10 may be associated with material data (e.g., data corresponding to substrate or raw material properties or characteristics), parametric data (e.g., data corresponding to machine and/or station performance, such as during operation of the industrial automation system 10), test results data (e.g., data corresponding to various quality control tests performed on a final or intermediate product of the industrial automation system 10), or the like, that may be organized and sorted as OT data. In addition, sensors 218 may gather OT data indicative of one or more operations of the industrial automation system 10 or the industrial control system 20. In this way, the OT data may be analog data or digital data indicative of measurements, statuses, alarms, or the like associated with operation of the industrial automation system 10 or the industrial control system 20.

The industrial control systems 12 described above may operate in an OT space in which OT data is used to monitor and control OT assets, such as the equipment illustrated in the stations 200, 202, 204, 206, 208, 210, 212, 214 of the industrial automation system 10 or other industrial equipment. The OT space, environment, or network generally includes direct monitoring and control operations that are coordinated by the industrial control system 20 and a corresponding OT asset. For example, a programmable logic controller (PLC) may operate in the OT network to control operations of an OT asset (e.g., drive, motor, and/or high-level controllers). The industrial control systems 20 may be specifically programmed or configured to communicate directly with the respective OT assets.

A container orchestration system 222, on the other hand, may operate in an information technology (IT) environment. That is, the container orchestration system 222 may include a cluster of multiple computing devices that coordinates an automatic process of managing or scheduling work of individual containers for applications within the computing devices of the cluster. In other words, the container orchestration system 222 may be used to automate various tasks at scale across multiple computing devices. By way of example, the container orchestration system 222 may automate tasks such as configuring and scheduling deployment of containers, provisioning and deploying containers, determining availability of containers, configuring applications in terms of the containers that they run in, scaling of containers to equally balance application workloads across an infrastructure, allocating resources between containers, performing load balancing, traffic routing, and service discovery of containers, performing health monitoring of containers, securing the interactions between containers, and the like. In any case, the container orchestration system 222 may use configuration files to determine a network protocol to facilitate communication between containers, a storage location to save logs, and the like. The container orchestration system 222 may also schedule deployment of containers into clusters and identify a host (e.g., node) that may be best suited for executing the container. After the host is identified, the container orchestration system 222 may manage the lifecycle of the container based on predetermined specifications.

With the foregoing in mind, it should be noted that containers refer to technology for packaging an application along with its runtime dependencies. That is, containers include applications that are decoupled from an underlying host infrastructure (e.g., operating system). By including the run time dependencies with the container, the container may perform in the same manner regardless of the host in which it is operating. In some embodiments, containers may be stored in a container registry 224 as container images 226. The container registry 224 may be any suitable data storage or database that may be accessible to the container orchestration system 222. The container image 226 may correspond to an executable software package that includes the tools and data employed to execute a respective application. That is, the container image 226 may include related code for operating the application, application libraries, system libraries, runtime tools, default values for various settings, and the like.

By way of example, an integrated development environment (IDE) tool may be employed by a user to create a deployment configuration file that specifies a desired state for the collection of nodes of the container orchestration system 222. The deployment configuration file may be stored in the container registry 224 along with the respective container images 226 associated with the deployment configuration file. The deployment configuration file may include a list of different pods and a number of replicas for each pod that should be operating within the container orchestration system 222 at any given time. Each pod may correspond to a logical unit of an application, which may be associated with one or more containers. The container orchestration system 222 may coordinate the distribution and execution of the pods listed in the deployment configuration file, such that the desired state is continuously met. In some embodiments, the container orchestration system 222 may include a master node that retrieves the deployment configuration files from the container registry 224, schedules the deployment of pods to the connected nodes, and ensures that the desired state specified in the deployment configuration file is met. For instance, if a pod stops operating on one node, the master node may receive a notification from the respective worker node that is no longer executing the pod and deploy the pod to another worker node to ensure that the desired state is present across the cluster of nodes.

As mentioned above, the container orchestration system 222 may include a cluster of computing devices, computing systems, or container nodes that may work together to achieve certain specifications or states, as designated in the respective container. In some embodiments, container nodes 228 may be integrated within industrial control systems 20 as shown in FIG. 3. That is, container nodes 228 may be implemented by the industrial control systems 20, such that they appear as worker nodes to the master node in the container orchestration system 222. In this way, the master node of the container orchestration system 222 may send commands to the container nodes 228 that are also configured to perform applications and operations for the respective industrial equipment.

With this in mind, the container nodes 228 may be integrated with the industrial control systems 20, such that they serve as passive-indirect participants, passive-direct participants, or active participants of the container orchestration system 222. As passive-indirect participants, the container nodes 228 may respond to a subset of all of the commands that may be issued by the container orchestration system 222. In this way, the container nodes 228 may support limited container lifecycle features, such as receiving pods, executing the pods, updating a respective filesystem to included software packages for execution by the industrial control system 20, and reporting the status of the pods to the master node of the container orchestration system 222. The limited features implementable by the container nodes 228 that operate in the passive-indirect mode may be limited to commands that the respective industrial control system 20 may implement using native commands that map directly to the commands received by the master node of the container orchestration system 222. Moreover, the container node 228 operating in the passive-indirect mode of operation may not be capable to push the packages or directly control the operation of the industrial control system 20 to execute the package. Instead, the industrial control system 20 may periodically check the file system of the container node 228 and retrieve the new package at that time for execution.

As passive-direct participants, the container nodes 228 may operate as a node that is part of the cluster of nodes for the container orchestration system 222. As such, the container node 228 may support the full container lifecycle features. That is, container node 228 operating in the passive-direct mode may unpack a container image and push the resultant package to the industrial control system 20, such that the industrial control system 20 executes the package in response to receiving it from the container node 228. As such, the container orchestration system 222 may have access to a worker node that may directly implement commands received from the master node onto the industrial control system 20.

In the active participant mode, the container node 228 may include a computing module or system that hosts an operating system (e.g., Linux) that may continuously operate a container host daemon that may participate in the management of container operations. As such, the active participant container node 228 may perform any operations that the master node of the container orchestration system 222 may perform. By including a container node 228 operating in the OT space, the container orchestration system 222 is capable of extending its management operations into the OT space (e.g., the container node 228 may provision devices in the OT space).

A proxy node 230, which may be an instance of the container node 228 or a different container node 228, may provide bi-directional coordination between the IT space and the OT space, and the like. For instance, the container node 228 operating as the proxy node 230 may intercept orchestration commands and cause industrial control system 20 to implement appropriate machine control routines based on the commands. The industrial control system 20 may confirm the machine state to the proxy node 230, which may then reply to the master node of the container orchestration system 222 on behalf of the industrial control system 20.

Additionally, the industrial control system 20 may share an industrial automation device tree via the proxy node 230. As such, the proxy node 230 may provide the master node with state data, address data, descriptive metadata, versioning data, certificate data, key information, and other relevant parameters concerning the industrial control system 20. Moreover, the proxy node 230 may issue requests targeted to other industrial control systems 20 to control other industrial automation devices. For instance, the proxy node 230 may translate and forward commands to a target industrial automation device using one or more OT communication protocols, may translate and receive replies from the industrial automation device s, and the like. As such, the proxy node 230 may perform health checks, provide configuration updates, send firmware patches, execute key refreshes, and other OT operations for other industrial automation devices.

In some embodiments, the industrial automation system 10 may include one or more mobile computing devices 26. The one or more mobile computing devices may include, for example, mobile phones, tablets, human machine interfaces (HMIs), or any other battery-operated computing device having a memory, processing circuitry, and one or more data collecting components/sensors. The data collecting components/sensors may be integrated within the mobile computing device 26 or communicatively coupled to the mobile computing device 26, and may include, for example, cameras or other imaging components, microphones, temperature sensors, accelerometers, gyroscopes, radio frequency (RF) scanners/receivers, infrared sensors, Light Detection and Ranging (LIDAR) sensors, global positioning system (GPS) sensors, Bluetooth sensors, radio transmitters/receivers, modems, etc. The mobile computing device 26 may be carried by a human operator/inspector or docked in or near the industrial automation. In some embodiments, the mobile computing device 26 may be coupled to a component of the industrial automation system 10 via a docking station. As will be described in more detail below, the mobile computing device 26 may be used by the operator/inspector to monitor operation of one or more components of the industrial automation system 10 and/or to perform inspections of one or more components of the industrial automation system.

Figure 4:
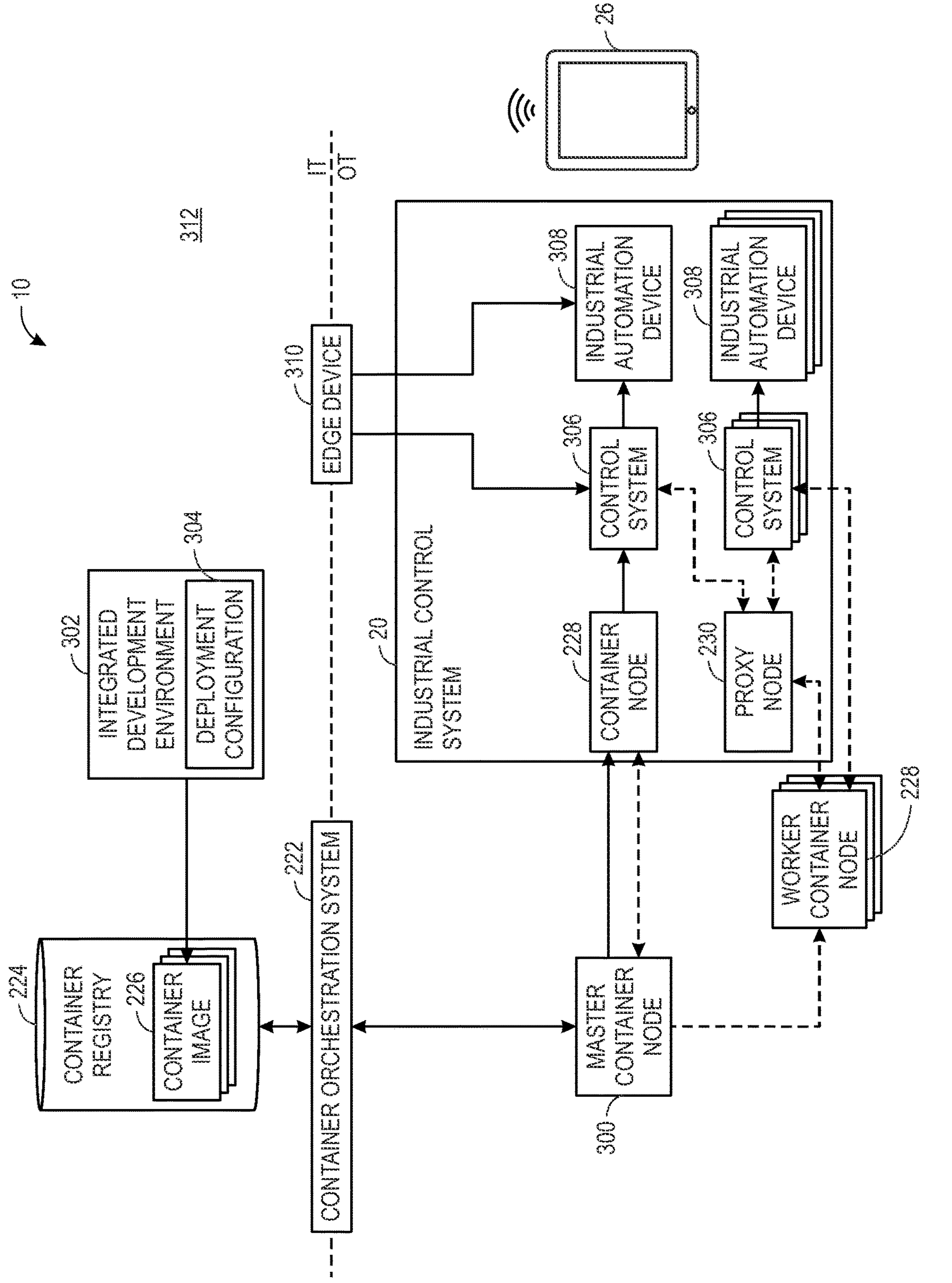
FIG. 4 is a block diagram of an example operational technology (OT) network, including the industrial control system of FIG. 3, that coordinates with a container orchestration system, in accordance with an embodiment.

FIG. 4 illustrates a block diagram that depicts the relative positions of the container node 228 and the proxy node 230 with respect to the container orchestration system 222. As mentioned above, the container orchestration system 222 may include a collection of nodes that are used to achieve a desired state of one or more containers across multiple nodes. As shown in FIG. 4, the container orchestration system 222 may include a master node 300 that may execute control plane processes for the container orchestration system 222. The control plane processes may include the processes that enable the container orchestration system 222 to coordinate operations of the container nodes 228 to meet the desired states. As such, the master container node 300 may execute an applications programming interface (API) for the container orchestration system 222, a scheduler component, core resource controllers, and the like. By way of example, the master container node 300 may coordinate all of the interactions between nodes of the cluster that make up the container orchestration system 222. Indeed, the master container node 300 may be responsible for deciding the operations that will run on container nodes 228 including scheduling workloads (e.g., containerized applications), managing the workloads' lifecycle, scaling, and upgrades, managing network and storage resources for the workloads, and the like. The master container node 300 may run an API server to handle requests and status updates received from the container nodes 228.

By way of operation, an integrated development environment (IDE) tool 302 may be used by an operator to develop a deployment configuration file 304. As mentioned above, the deployment configuration file 304 may include details regarding the containers, the pods, constraints for operating the containers/pods, and other information that describe a desired state of the containers specified in the deployment configuration file 304. In some embodiments, the deployment configuration file 304 may be generated in a YAML file, a JSON file, or other suitable file format that is compatible with the container orchestration system 222. After the IDE tool 302 generates the deployment configuration file 304, the IDE tool 302 may transmit the deployment configuration file 304 to the container registry 224, which may store the file along with container images 226 representative of the containers stored in the deployment configuration file 304.

In some embodiments, the master container node 300 may receive the deployment configuration file 304 via the container registry 224, directly from the IDE tool 302, or the like. The master container node 300 may use the deployment configuration file 304 to determine a location to gather the container images 226, determine communication protocols to use to establish networking between container nodes 228, determine locations for mounting storage volumes, locations to store logs for the containers, and the like.

Based on the desired state provided in the deployment configuration file 304, the master container node 300 may deploy containers to the container host nodes 228. That is, the master container node 300 may schedule the deployment of a container based on constraints (e.g., CPU or memory availability) provided in the deployment configuration file 304. After the containers are operating on the container nodes 228, the master container node 300 may manage the lifecycle of the containers to ensure that the containers specified by the deployment configuration file 304 are operating according to the specified constraints and the desired state.

Keeping the foregoing in mind, the industrial control system 20 may not use an operating system (OS) that is compatible with the container orchestration system 222. That is, the container orchestration system 222 may be configured to operate in the IT space that involves the flow of digital information. In contrast, the industrial control system 20 may operate in the OT space that involves managing the operation of physical processes and the machinery used to perform those processes. For example, the OT space may involve communications that are formatted according to OT communication protocols, such as FactoryTalk LiveData, EtherNet/IP, Common Industrial Protocol (CIP), OPC Direct Access (e.g., machine to machine communication protocol for industrial automation developed by the OPC Foundation), OPC Unified Architecture (OPCUA), or any suitable OT communication protocol (e.g. DNP3, Modbus, Profibus, LonWorks, DALI, BACnet, KNX, EnOcean). Because the industrial control systems 20 operate in the OT space, the industrial control systems may not be capable of implementing commands received via the container orchestration system 222.

In certain embodiments, the container node 228 may be programmed or implemented in the industrial control system 20 to serve as a node agent that can register the industrial control system 20 with the master container node 300. The node agent may or may not be the same as the proxy node 230 shown in FIG. 3. For example, the industrial control system 20 may include a PLC that cannot support an operating system (e.g., Linux) for receiving and/or implementing requested operations issued by the container orchestration system 222. However, the PLC may perform certain operations that may be mapped to certain container events. As such, the container node 228 may include software and/or hardware components that may map certain events or commands received from the master container node 300 into actions that may be performed by the PLC. After converting the received command into a command interpretable by the PLC, the container node 228 may forward the mapped command to the PLC that may implement the mapped command. As such, the container node 228 may operate as part of the cluster of nodes that make up the container orchestration system 222, while a first control system 306 (e.g., PLC) that coordinates the OT operations for a second industrial automation device 308 in the industrial control system 12. The first control system 306 may include a controller, such as a PLC, an HLC, a programmable automation controller (PAC), or any other controller that may monitor, control, and operate an industrial automation device or component.

The industrial automation device 308 may correspond to an industrial automation device or component and may include any suitable industrial device that operates in the OT space. As such, the industrial automation device 308 may be involved in adjusting physical processes being implemented via the industrial system 10. In some embodiments, the industrial automation device 308 may include motors, contactors, starters, sensors, drives, relays, protection devices, switchgear, compressors. In addition, the industrial automation device 308 may also be related to various industrial equipment such as mixers, machine conveyors, tanks, skids, specialized original equipment manufacturer machines, and the like. The industrial automation device 308 may also be associated with devices used by the equipment such as scanners, gauges, valves, flow meters, and the like.

In the present embodiments described herein, the control system 306 may thus perform actions based on commands received from the container node 228. By mapping certain container lifecycle states into appropriate corresponding actions implementable by the control system 306, the container node 228 enables program content for the industrial control system 20 to be containerized, published to certain registries, and deployed using the master container node 300, thereby bridging the gap between the IT-based container orchestration system 222 and the OT-based industrial control system 20.

In some embodiments, the container node 228 may operate in an active mode, such that the container node may invoke container orchestration commands for other container nodes 228. For example, a proxy node 230 may operate as a proxy or gateway node that is part of the container orchestration system 222. The proxy node 230 may be implemented in a sidecar computing module that has an operating system (OS) that supports the container host daemon. In another embodiment, the proxy node 230 may be implemented directly on a core of the control system 306 that is configured (e.g., partitioned), such that the control system 306 may operate using an operating system that allows the container node 228 to execute orchestration commands and serve as part of the container orchestration system 222. In either case, the proxy node 230 may serve as a bi-directional bridge for IT/OT orchestration that enables automation functions to be performed in IT devices based on OT data and in industrial automation control systems 306 and industrial automation devices 308 based on IT data. For instance, the proxy node 230 may acquire industrial automation device tree data, state data for an industrial automation device, descriptive metadata associated with corresponding OT data, versioning data for industrial automation control systems 306 and industrial automation devices 308, certificate/key data for the industrial automation device, and other relevant OT data via OT communication protocols. The proxy node 230 may then translate the OT data into IT data that may be formatted to enable the master container node 300 to extract relevant data (e.g., machine state data) to perform analysis operations and to ensure that the container orchestration system 222 and the connected control systems 306 are operating at the desired state. Based on the results of its scheduling operations, the master container node 300 may issue supervisory control commands to targeted industrial automation device via the proxy nodes 230, which may translate and forward the translated commands to the respective control system 306 via the appropriate OT communication protocol.

In addition, the proxy node 230 may also perform certain supervisory operations based on its analysis of the machine state data of the respective control system 306. As a result of its analysis, the proxy node 230 may issue commands and/or pods to other nodes that are part of the container orchestration system 222. For example, the proxy node 230 may send instructions or pods to other worker container nodes 228 that may be part of the container orchestration system 222. The worker container nodes 228 may corresponds to other container nodes 228 that are communicatively coupled to other control systems 306 for controlling other industrial automation devices 308. In this way, the proxy node 230 may translate or forward commands directly to other control systems 306 via certain OT communication protocols or indirectly via the other worker container nodes 228 associated with the other control systems 306. In addition, the proxy node 230 may receive replies from the control systems 306 via the OT communication protocol and translate the replies, such that the nodes in the container orchestration system 222 may interpret the replies. In this way, the container orchestration system 222 may effectively perform health checks, send configuration updates, provide firmware patches, execute key refreshes, and provide other services to industrial automation devices 308 in a coordinated fashion. That is, the proxy node 230 may enable the container orchestration system to coordinate the activities of multiple control systems 306 to achieve a collection of desired machine states for the connected industrial automation devices 308.

As shown in FIG. 4, the industrial automation system 10 may include one or more edge devices 310 that interact with OT assets 306, 308 within the industrial automation system 10. As used herein, an "edge device" 310 is a device within the industrial automation system 10 that controls data flow within the industrial automation system 10 (e.g., the OT network) as well as between the industrial automation system 10 (e.g., the OT network) and an IT network 312. For example, the edge device 310 may be a router, a switch, or the like. In certain embodiments, the edge device 310 may receive data from the network 312 that may include, for example, an enterprise system, a server device, a plant management system, or the like. The enterprise system may include software and/or hardware components that support business processes, information flows, reporting, data analytics, and the like for an enterprise. The server device may manage communication between the components of the industrial automation system 10. The plant management system may include any suitable management computing system that receives data from a number of control systems (e.g., industrial control systems 20). As such, the plant management system may track operations of one or more facilities and one or more locations. In addition, the plant management system may issue control commands to the components of the industrial automation system 10.

As previously described, the mobile computing device 26 may be carried by an operator or inspector and used to monitor the operations of one or more components of the industrial automation system and/or perform inspections of one or more components of the industrial automation system. In some embodiments, the mobile computing device 26 may have the same or similar capabilities as the edge device 310. In some embodiments, the mobile computing device 26 may also act as a container node configured to run one or more containers. The mobile computing device 26 may run a native inspection application or access an inspection tool via a web browser.

Inspection systems for industrial automation systems are typically expensive, designed to perform a single type of inspection and/or inspect a single type of device, require specialized training by an operator, may require specific conditions to operate (e.g., ambient light levels, temperature ranges, lack of movement, etc.) and tend to be fixed in place within a facility. Further, such specialized inspection systems typically produce data of significantly higher resolution than is needed for an initial inspection. However, mobile computing devices 26 (e.g., smartphones, tablets, etc.) carried by inspectors on a factory floor, or mobile computing devices 26 docked within a facility for other purposes, may be equipped with various sensors and processing capabilities, or combined with external sensors and/or processing capabilities, to perform initial inspections of sufficient resolution to identify conditions and/or determine if further inspection is warranted.

Figure 5:
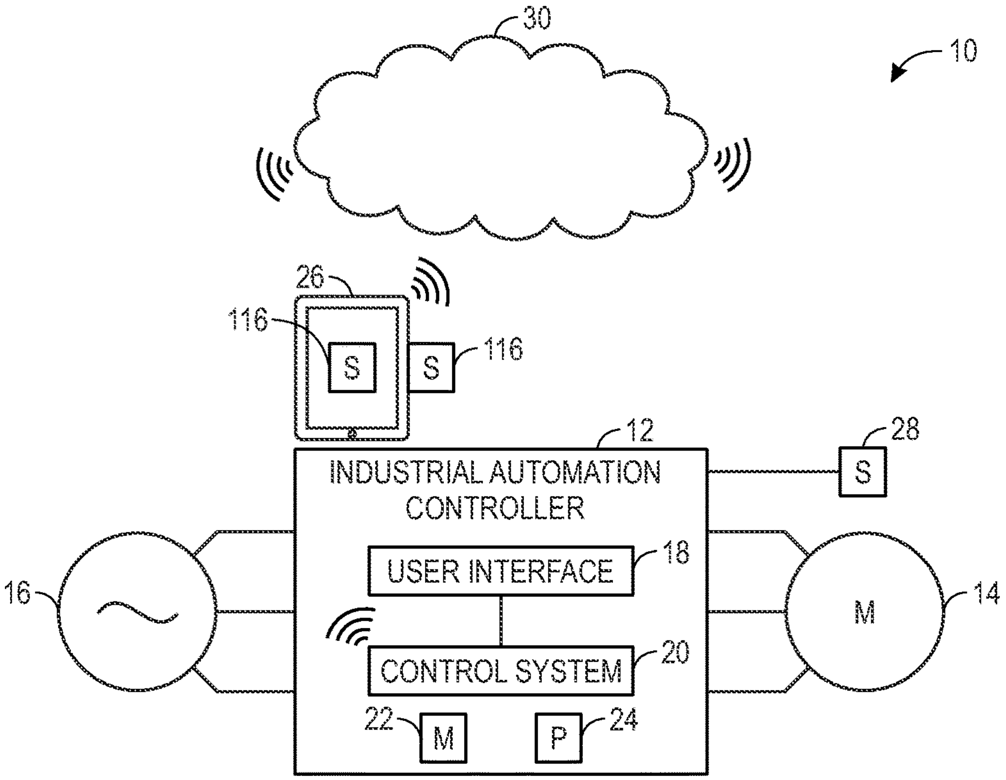
FIG. 5 is a schematic view of a mobile computing device performing an inspection of the industrial automation system of FIG. 1, in accordance with an embodiment.

FIG. 5 is a schematic view of the mobile computing device 26 performing an inspection of the industrial automation system 10 of FIG. 1. The mobile computing device 26 may be equipped with a native inspection application and/or an inspection tool accessible via a web browser of the mobile computing device 26. The mobile computing device 26 may receive an indication of an inspection being triggered. In some embodiments, the inspection may be a scheduled inspection. For example, the inspector of the industrial automation system 10 may have a policy of conducting inspections every 30 minutes, every hour, every two hours, before the beginning of each shift, at specified times throughout the day, once a day, once a week, once a month, once a quarter, once a year, or some other scheduled time interval. In other embodiments, the inspection may be a routine inspection that may be carried out by an inspector at his or her leisure. For example, an inspector may be tasked with one or more sets of inspections per day in which the inspector is tasked with walking the factory floor and performing various inspections as he or she walks the factory floor. In further embodiments, the inspector may carry a mobile device 26 that is configured to receive a notification and display the notification to the inspector with instructions to perform an inspection of one or more particular components of the industrial automation system 10 based on a condition being detected, a scheduled inspection, etc. For example, a system may request an inspection of a particular component of the industrial automation system, identify a profile of an inspector to perform the inspection (e.g., based on proximity of the inspector's mobile device to the component of the industrial automation system to be inspected, based on the inspector's proficiency in performing the inspection of the component of the industrial automation system 10, etc.), generate a notification with instructions to inspect the component of the industrial automation system 10, and transmit the notification to the mobile device 26 associated with the profile on the inspector.

In some embodiments, the inspection may be triggered by a condition of one or more components of the industrial automation device 10 being detected. For example, an inspection may be triggered in response to an alarm generated by the industrial automation system 10, an alert generated by an industrial automation system 10, an abnormality reported, a monitored operational parameter (e.g., temperature, speed, torque, voltage, current, pressure, flow rate, etc.) being above or below some threshold value, or outside of an operational window of values, or some other trigger. In embodiments in which the inspection is triggered in response to a specific condition, the condition may be detected by the component in question, a different component, the industrial automation system 10 itself, or by some device (e.g., a sensor 28, 116) monitoring one or more components of the industrial automation system 10. In response to the condition being detected, a notification (e.g., a push notification, an SMS text message, an email, etc.) may be generated with instructions to perform an inspection and transmitted to the mobile device 26 for display. As previously described, if there are multiple mobile computing devices 26 available, to which mobile device the notification is transmitted may be determined based on proximity to the industrial automation system 10, proximity to the component of the industrial automation system 10 in question, the measurement capabilities of the mobile device 26 (e.g., the type of sensors 116 on board or to which the mobile computing device 26 is communicatively coupled), the skills, qualifications, or other characteristics of the inspector profile associated with the mobile device 26, one or more additional factors, or some combination thereof.

Upon arrival of the mobile computing device 26 to the industrial automation system 10 to be inspected, the mobile computing device 26 may be used (e.g., via one or more sensors 116) to scan the industrial automation system 10. In some embodiments, this may include scanning a bar code or quick response (QR) code on a component of the industrial automation device. The bar code or QR code may be a label or sticker affixed to the housing of the component of the industrial automation system 10, etched or printed onto the housing of the component of the industrial automation system 10, displayed by a display of the industrial automation system 10 (e.g., a user interface, HIM, etc.). In other embodiments, the mobile device 26 may be used to scan an RFID tag of the industrial automation device, or otherwise scan for the device using NFC, Bluetooth, RF, etc. In further embodiments, a camera or other imaging sensor of the mobile computing device 26 may be configured to capture a photograph, video, or other image of the industrial automation system 10. Scanning the industrial automation system 10 may help the mobile computing device 26 to identify the industrial automation system 10 or the component of the industrial automation system 10 to be inspected.

In some embodiments, the scanned codes may include information, or trigger the transmission of information to the mobile computing device 26, regarding one or more inspections to be performed, instructions and/or guidelines for performing the one or more inspections to be performed, links to media to be displayed by the mobile device 26 (e.g., instructions for performing the one or more inspections, instructions for interpreting inspections, information about past inspections, maintenance data, baseline values, threshold values, etc.). After performance of the scan, or receiving a selection of an inspection to be performed, the mobile computing device 26 may display instructions for performing the inspection within the native mobile application of the web browser of the mobile computing device 26. The instructions may include, for example, text-based step-by-step guides for performing inspections, identification of common mistakes and how to avoid the mistakes, images illustrating how to perform an inspection, videos of how to perform an inspection, animations of how to perform an inspection, and so forth, or some combination thereof. The instructions may indicate placement of the mobile computing device 26 relative to the industrial automation device, how to capture data using the sensor 116 and/or the mobile computing device 26, ambient conditions for the inspection, such as lighting, wind, noise, etc., operating conditions of the industrial automation system 10 during inception, how to determine if inspection data is usable, identifying anomalies in inspection data, diagnosing conditions, remedial actions, etc. In some embodiments, the industrial automation system 10, or components of the industrial automation system 10 may be equipped with markings for locating the mobile computing device 26, identifying areas to be captured in an image or other data collection process, and so forth.

In some embodiments, images, audio recordings, RF scans, and other data collected, either during the initial phase of inspections, or during other times during the inspection, may be used to create inspection baselines for identifying when things have changed between inspections. Accordingly, during the initial phase of the inspection and/or other times during the inspection, collected data may be compared to baseline data to determine whether anything has changed. This may be used to identify, for example, components in unexpected positions, unexpected movements, unexpected sounds, unexpected temperatures, wiring changes, switches or other user interface components in different positions, different combinations of LEDs illuminated, different operational settings, and so forth. Further, the mobile computing device 26 or the cloud/remote server 30 may be configured to identify drift, step changes, and/or other changes in collected data over time (e.g., across multiple inspections).

In some embodiments, the inspection may include an initial phase to identify anomalous conditions and/or determine if further inspection is warranted. For example, in the initial phase of the inspection, the mobile computing device 26 may be used to capture one or more images, audio recordings, RF scans, or some combination thereof of one or more components of an industrial automation system 10. The data collected during the initial phase of the inspection may be processed by the mobile computing device 26 or transmitted to a cloud/remote server 30 and/or edge device for processing. The initial phase of the inspection may be used to identify components in unexpected locations, unexpected movements, unexpected sounds, and so forth. Further, in some embodiments, a component of the industrial automation system 10 may be configured to provide a signal (e.g., via flashing LEDs, a display, etc.) that may be detected by the mobile computing device 26, but not detectable by the human inspector (e.g., the LEDs or display flashing at a frequency not visible to or perceptible by the human eye, emitting a sound not audible by the human ear, or some other signal). The signal may be communicated by the frequency of flashing, flashing according to some pattern, sounds, etc. The signal may be indicative of a detected condition, an error code, a request for an inspection, the component of the component of the industrial automation system 10 being in a particular state (e.g., safe state), an alert/alarm, etc.

As previously described, performing the inspection may include using one or more sensors 116, which may be integrated into the mobile computing device 26 or external to the mobile computing device 26, to collect one or more types of data associated with the industrial automation system 10. For example, the inspection may include collecting audio data (e.g., an audio recording) during operation of the industrial automation system 10. For components with moving parts, such as gear boxes, motors, pumps, fans, valves, conveyors, and so forth, audio data may be used to identify certain conditions that may be present, such as worn parts, insufficient lubrication, seized bearings, failed seals, etc. In some embodiments, the audio data may be accompanied by, and in some cases synchronized with, one or more images (e.g., still images or video) to identify components that are in unexpected positions, moving in unexpected ways, and so forth.

The inspection may also utilize one or more accelerometers and/or gyroscopes of the mobile computing device 26. For example, the inspection may include setting the mobile computing device 26 on top of, or up against, a component of the industrial automation system 10, such as a gear box, and collecting vibration data, which may or may not be combined with audio data. The collected data may be analyzed by the mobile computing device 26 and/or transmitted to the cloud/remote server 30 and/or an edge device for processing to determine if the component is operating as expected and/or whether to recommend that any maintenance and/or service be performed.

The inspection may also utilize a thermometer or other temperature sensor 116. In some embodiments, the temperature sensor may be integrated into the mobile device 22 and configured to detect ambient temperature of the environment around the mobile computing device 26. In other embodiments, the temperature sensor may be a sensor 116 external to the mobile computing device 26 that couples to the mobile computing device 26 via a wired or wireless connection. In such an embodiment, the temperature sensor may be configured to sense the ambient temperature in the environment, or the temperature of specific surfaces or locations by direct contact measurement (e.g., a thermocouple, probe, etc.) or indirect no-contact measurement (e.g., infrared thermometer). The mobile computing device 26 and/or cloud/remote server 30 may be configured to incorporate the temperature data into other inspection data, if any, and determine if one or more measured temperatures are above or below expected values, above or below threshold values, below, inside, or above operating windows, and so forth.

In other embodiments, the sensor 116 may be an infrared imaging sensor configured to generate images of heat distributions within the industrial automation system 10 and surrounding areas. Such data may be used by the computing device 26, the cloud/remote server 30, and/or edge device to determine if certain components of the component of the industrial automation system 10, areas of the industrial automation system 10, surfaces of the industrial automation system 10, and so forth are warmer than expected, cooler than expected, or within expected ranges.

In some embodiments, the sensor 116 may be an onboard or external RF sensor or receiver configured to act as an electromagnetic field (EMF) sensor and/or to detect harmonics. In such embodiments, data collected from the sensor 116 could be used by the computing device 26 and/or cloud/remote server 30 to detect drive signatures, power surges, and so forth, which may be indicative of anomalous conditions. In response to these anomalous conditions being detected, the computing device 26, cloud/remote server 30, and/or edge device may recommend that a component be replaced, identify interactions between two or more components in or around the industrial automation system 10, and so forth.

Though previous discussions have been focused on performing inspections of industrial automation systems, components of industrial automation systems 10, or equipment used in the performance of an industrial automation process, it should be understood that embodiments are envisaged in which other things are being inspected. For example, inspections may be performed to assess the quantity and/or quality of raw materials in stock. For example, an inspector may perform inspections of raw materials or ingredients in stock, newly arrived, or as they arrive to determine how much of the raw material is in stock or in a shipment and to confirm that the raw material at least appears to be the correct raw material. For example, in a facility that makes cookies, an inspection may be performed to confirm that the correct amount of sugar was delivered and that the product delivered was actually sugar and not butter, milk, corn syrup, etc. Similarly, inspections may be performed for packaging to determine the amount of packaging on hand and that the packaging is of the expected quality. Along these lines, the mobile computing device 26 may also be used to perform quality control inspections for products produced. In such an embodiment, the mobile computing device 26 may capture video, images, or collect other data and remain stationary or somewhat stationary relative to the product, which may be on a conveyor, pallet, etc. In other embodiments, an inspector may select a product, pick the product up, and use the mobile computing device 26 to perform an inspection of the product using a camera and/or one or more other sensors of the mobile computing device 26.

Other embodiments are envisaged in which the mobile computing device 26 utilizes LIDAR, GPS, Bluetooth, radio transmitters/receivers, cellular transmitters/receivers, accelerometers, and/or other capabilities of the mobile computing device 26 to perform inspections of industrial automation systems 10, components of industrial automation systems 10, equipment, raw materials, ingredients, packaging, product that is mid-process being produced, or has been produced, and so forth.

After an inspection has been performed and data has been collected, the inspection data may be processed locally on the mobile computing device 26, on a nearby compute surface, such as an edge device, workstation, on-prem server, etc. which may process the inspection data using one or more containers, a cloud/remote server, or some combination thereof. If processing of the inspection data is performed external to the mobile computing device 26, the mobile computing device 26 may perform some pre-processing of the inspection data to clean up the data, reduce the size of the data, and so forth. However, in other embodiments, the mobile computing device 26 may transmit raw inspection data to the external device for processing. Once the data has been processed, the results may be transmitted back to the mobile computing device 26 (if the inspection data was processed externally) and displayed via the display of the mobile computing device 26 in the native application or web browser.

After the inspection has been processed, the mobile computing device 26 may recommend next steps to the inspector. If the inspection is as expected and the inspected item passes inspection, no further action may be recommended. However, if the inspected item fails inspection, or some unexpected condition is identified, the mobile computing device 26 may display a recommendation to perform one or more additional inspections with the mobile computing device 26, perform an inspection with more specialized inspection equipment, stop the industrial automation system 10, put the industrial automation system 10 into a safe state, order more raw materials/ingredients, order a replacement part, schedule service, schedule maintenance, adjust one or more operational parameters, schedule the next inspection on a shorter or longer time frame, work through a troubleshooting guide, initiate performance of a workflow, etc.

Figure 6:
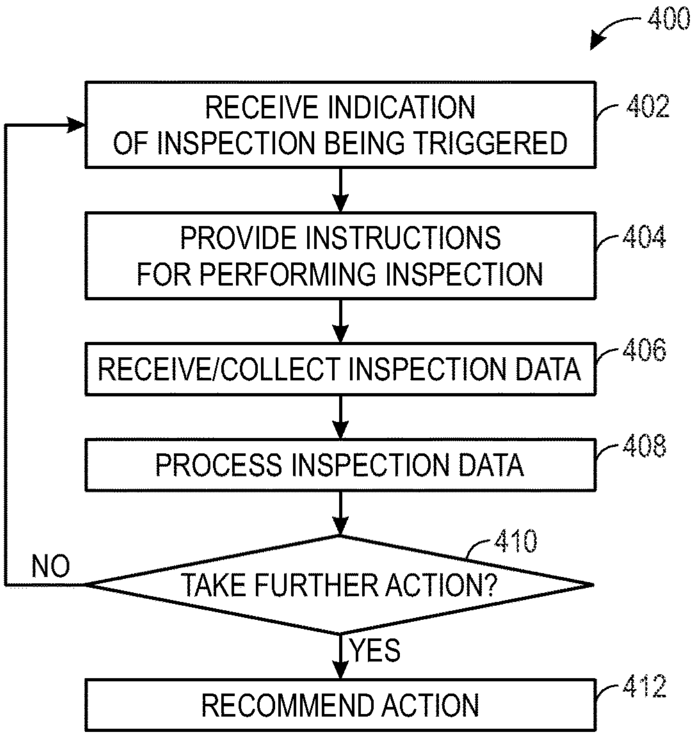
FIG. 6 is a flow chart of a process for performing an inspection of the industrial automation system of FIG. 1, in accordance with an embodiment.

FIG. 6 is a flow chart of a process 400 for performing inspections of industrial automation systems. At block 402, the process 400 receives and indication of an inspection being triggered. In some embodiments, the indication of the inspection being triggered may be an input received via the user interface of a mobile computing device selecting an inspection to be performed or scanning an item to be inspected. In other embodiments, the indication of the inspection being triggered may be in response to a condition of the industrial automation system being detected. In further embodiments, the indication of the inspection being triggered may be based on a period of time elapsing or an inspection being scheduled for a particular time.

At block 404, the process 400 may provide instructions for performing the inspection. For example, the process 400 may cause a display of the mobile computing device to display instructions for performing the inspection. The instructions may include, for example, text, images, video, or some combination thereof. The instructions may indicate settings for the item being inspected during inspection, placement of the mobile computing device during inspection, how to go about collecting data, ambient conditions during inspection (e.g., ambient light, movement, noise levels, wind speed, etc.).

At block 406, inspection data may be received or collected via the mobile computing device. As previously described, the inspection data may be collected using one or more sensors, which may be integrated within the mobile computing device or external to the mobile computing device and communicatively coupled to the mobile computing device via a wired or wireless connection. The one or more sensors may include cameras or other imaging components, microphones, temperature sensors, accelerometers, gyroscopes, RF scanners/receivers, infrared sensors, LIDAR sensors, GPS sensors, Bluetooth sensors, radio transmitters/receivers, modems, and so forth. In some embodiments, the mobile computing device may control the operation of one or more of the sensors during the inspection.

At block 408, the process 400 processes the inspection data. In some embodiments, the inspection data may be processed locally on the mobile computing device, whereas in other embodiments, the inspection data may be transmitted to a nearby compute surface, such as an edge device, workstation, on-prem server, etc. which may process the inspection data using one or more containers, a cloud/remote server, or some combination thereof for processing. If the inspection data is processed external to the mobile computing device, inspection results may be transmitted back to the mobile computing device. The results, whether processed by the mobile computing device or external to the mobile computing device, may be displayed via a user interface of the mobile computing device.

At decision 410, the process determines whether to recommend further action. If, for example, the inspected item passes inspection, the process may recommend no further action and return to block 402, waiting for an indication of a subsequent inspection being triggered. However, if further action is recommended (e.g., the inspected item fails inspection, or some unexpected condition is identified, etc.), the process 400 may proceed to block 412 and recommend that further action be taken. The recommended action may include, for example, performing one or more additional inspections with the mobile computing device, performing an inspection with more specialized inspection equipment, stopping the industrial automation system, putting the industrial automation system into a safe state, ordering more raw materials/ingredients, ordering a replacement part, scheduling service, scheduling maintenance, adjusting one or more operational parameters, scheduling the next inspection on a shorter or longer time frame, working through a troubleshooting guide, initiating performance of a workflow, etc.

The present disclosure is related to using a mobile device for inspection of industrial automation systems. Specifically, a mobile device may be equipped with an inspection application, which may run natively on the mobile device or as a web application. An inspection may be triggered in some way. In some cases, the inspection may be a routine or scheduled inspection that may be carried out by an inspector at his or her leisure or in response to a notification displayed by the mobile device. In other cases, the inspection may be triggered by a condition of an industrial automation system being detected. In such cases, the condition may be detected, either by the system itself or by some device monitoring the system, and a notification (e.g., a push notification) may be generated and displayed by the mobile device requesting that an inspector perform an inspection of the device. In some cases, a particular mobile device within the facility may be selected based upon its proximity to the industrial automation system in question, the skills of the inspector associated with the mobile device, or some other factor.

Upon arrival at the industrial automation system to be inspected, the mobile device may be used to scan a bar code, a QR code, an RFID tag, photograph the system and/or a label on the industrial automation system, take a video of the system, etc. to identify the industrial automation system to be inspected. In some cases, the scanned codes may include information, such as inspections to be performed, how to perform inspections, links to media to be consumed by the inspector, baseline values, threshold values, maintenance history, etc. The mobile device may display, via the inspection application, instructions for performing the inspection using the mobile device. In some cases, the industrial automation system may be equipped with markings that indicate where an inspector should place the mobile device to collect data, and/or areas to capture via photo and/or video.

In some cases, the inspection may include a photo, video, or radio frequency (RF) scan of the industrial automaton system to identify anomalous conditions and/or determine if further inspection is warranted. For example, in some embodiments, the industrial automation device may communicate data to the mobile device that may not be perceptible to the inspector, such as display/LED flashing patterns, sounds, and so forth, which may communicate an error code or an anomalous condition has been detected. In some cases, routine photo, video, RF scans collected during inspections at certain intervals may be analyzed to identify drift, steps, or other changes over time. Accordingly, data from scans may be used to create inspection baselines and to identify when something changed (e.g., wiring change, switches in different positions, different operational settings, etc.). The inspection may include, for example, collecting audio data via the microphone of the mobile device. Performing an inspection may include, for example, setting the mobile device on a component of the industrial automation system (e.g., a gearbox) and using the accelerometers, gyroscope, and/or microphone of the mobile device to collect vibration data. In some cases, an on-board or add-on thermometer may be used to collect temperature data. Some inspection may utilize accessory sensors that couple to the mobile device. For example, the mobile device may couple to an IR sensor or imaging device to collect IR sensor data. Similarly, an on-board or add-on RF receiver may be used to detect harmonics and/or act as an EMF sensor, which could be used to detect drive signatures, power surges, and so forth, which can be correlated to particular anomalous conditions like a component that needs to be replaced or undesirable interactions between two or more components. Further, the camera of the mobile device could be used to take photos or video of product for QC. Other inspections may utilize the LIDAR, GPS, Bluetooth, radio/modem, accelerometers, and/or other capabilities of the mobile device to perform inspections of equipment, raw materials, and/or product being produced.

Inspection data could be processed on the mobile device itself, sent to another device (e.g., on-prem server, cloud-server, remote sever, workstation computer, container, edge device, etc.) for processing, or some combination thereof. Once analysis of the inspection data has been performed, the system may determine next steps. For example, in some cases, no further action may be warranted. In other cases, the inspector may be asked to perform additional inspections using the mobile device. In further cases, a technician or another inspector may be called to perform more inspections, perform maintenance, perform troubleshooting, repair the industrial automation system, and so forth. Accordingly, a mobile device running an inspection application may be an inexpensive, easy, and available option for performing initial inspections of industrial automation systems, allowing problems to be caught early or avoided entirely, reduce downtime, etc. Further, collected data may be provided to machine learning algorithms, which may provide further insights on diagnostics and/or maintenance.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A method, comprising:

receiving an indication of an inspection of an industrial automation device being triggered;

causing to be displayed, via a display of a mobile computing device, instructions for performing the inspection of the industrial automation device;

receiving, via one or more sensors, inspection data collected by the one or more sensors during the inspection, wherein the one or more sensors are integrated into the mobile computing device, communicatively coupled to the mobile computing device, or both, and comprise a microphone, a temperature sensor, an accelerometer, a gyroscope, a radio frequency (RF) scanner/receiver, an infrared sensor, a light detection and ranging (LIDAR) sensor, a global positioning system (GPS) sensor, a Bluetooth sensor, a radio transmitter, a radio receiver, or any combination thereof, wherein the inspection data is associated with the industrial automation device;

processing the inspection data associated with the industrial automation device to generate a diagnostic assessment of a condition of the industrial automation device based on results of the inspection of the industrial automation device; and causing to be displayed, via the display of the mobile computing device, the results of the inspection of the industrial automation device.

2. The method of claim 1, wherein the inspection data comprises one or more audio recordings, vibration data, one or more RF scans, temperature data, infrared imaging data, electromagnetic field (EMF) data, accelerometer data, gyroscope data, LIDAR data, or any combination thereof.

3. The method of claim 1, wherein the indication of the inspection of the industrial automation device being triggered is in response to a condition being detected.

4. The method of claim 3, wherein the detected condition is communicated from the industrial automation device to the mobile computing device via a signal that is not perceptible by a human.

5. The method of claim 1, wherein the indication of the inspection of the industrial automation device being triggered is for a scheduled inspection.

6. The method of claim 1, wherein the indication of the inspection of the industrial automation device being triggered is in response to the inspection being selected via an input to the mobile computing device.

7. The method of claim 1, wherein the indication of the inspection of the industrial automation device being triggered is in response to performing a scan of a bar code of the industrial automation device, a quick response (QR) code of the industrial automation device, a radio frequency identification (RFID) tag of the industrial automation device, or any combination thereof.

8. The method of claim 7, wherein the scan provides one or more baseline values, one or more threshold values, a maintenance history of the industrial automation device, operational parameter settings of the industrial automation device, or any combination thereof.

9. The method of claim 1, wherein performing the inspection comprises setting the mobile computing device on a surface of the industrial automation device.

10. The method of claim 1, wherein the inspection comprises a photograph of the industrial automation device and wherein processing the inspection data associated with the industrial automation device comprises comparing the photograph of the industrial automation device to previous photographs of the industrial automation device from one or more previous inspections to identify one or more wiring changes, one or more user interface components in different positions, one or more different operational parameter settings, or any combination thereof.

11. The method of claim 1, wherein the inspection data comprises one or more images or video of product produced by the industrial automation device.

12. A non-transitory computer readable medium storing instructions that, when executed by processing circuitry of a mobile computing device, cause the processing circuitry to perform actions comprising:

receiving an indication of an inspection of an industrial automation device being triggered;

causing to be displayed, via a display of the mobile computing device, instructions for performing the inspection of the industrial automation device;

receiving, via one or more sensors, inspection data collected by the one or more sensors during the inspection, wherein the one or more sensors are integrated into the mobile computing device, communicatively coupled to the mobile computing device, or both, and comprise a microphone, a temperature sensor, an accelerometer, a gyroscope, a radio frequency (RF) scanner/receiver, an infrared sensor, a light detection and ranging (LIDAR) sensor, a global positioning system (GPS) sensor, a Bluetooth sensor, a radio transmitter, a radio receiver, or any combination thereof, wherein the inspection data is associated with the industrial automation device; and causing to be displayed, via the display of the mobile computing device, results of the inspection of the industrial automation device.

13. The non-transitory computer readable medium of claim 12, wherein the actions comprise controlling at least one of the one or more sensors during the inspection.

14. The non-transitory computer readable medium of claim 12, wherein the actions comprise processing, via the processing circuitry of the mobile computing device, the inspection data associated with the industrial automation device to generate a diagnostic assessment of a condition of the industrial automation device based on the results of the inspection of the industrial automation device.

15. The non-transitory computer readable medium of claim 12, wherein the actions comprise:

transmitting the inspection data to an edge device for processing; and receiving, from the edge device, the results of the inspection of the industrial automation device.

16. The non-transitory computer readable medium of claim 12, wherein the actions comprise:

transmitting the inspection data to a cloud server or a remote server for processing; and receiving, from the cloud server or the remote server, the results of the inspection of the industrial automation device.

17. The non-transitory computer readable medium of claim 12, wherein the actions comprise recommending a further action based on the results of the inspection of the industrial automation device, wherein the further action comprises an additional inspection, scheduling maintenance or service, displaying a troubleshooting guide, or any combination thereof.

18. An edge device, comprising:

processing circuitry; and memory, accessible by the processing circuitry, the memory storing instructions that, when executed by the processing circuitry, cause the processing circuitry to perform actions comprising:

receiving, via one or more sensors, inspection data collected by the one or more sensors during an inspection, wherein the one or more sensors are integrated into a mobile computing device, communicatively coupled to the mobile computing device, or both, wherein the inspection data is associated with an industrial automation device, wherein the inspection data comprises one or more images, one or more videos, one or more audio recordings, vibration data, one or more radio frequency (RF) scans, temperature data, infrared imaging data, electromagnetic field (EMF) data, accelerometer data, gyroscope data, light detection and ranging (LIDAR) data, or any combination thereof;

processing, via a containerized application running in a container executed by the edge device, the inspection data associated with the industrial automation device to generate a diagnostic assessment of a condition of the industrial automation device based on results of the inspection of the industrial automation device; and transmitting, to the mobile computing device, the results of the inspection of the industrial automation device.

19. The edge device of claim 18, wherein processing the inspection data associated with the industrial automation device comprises identifying drift or steps compared to previous inspection data from one or more previous inspections.

20. The edge device of claim 18, wherein the actions comprise recommending a further action based on the results of the inspection of the industrial automation device, wherein the further action comprises an additional inspection, scheduling maintenance or service, displaying a troubleshooting guide, or any combination thereof.

* * * * *